United States Patent
Bottomley et al.

(10) Patent No.: US 10,810,129 B2
(45) Date of Patent: Oct. 20, 2020

(54) APPLICATION MEMORY ORGANIZER

(71) Applicant: International Business Machines Corporation, Armonk, NY (US)

(72) Inventors: Gareth I. Bottomley, Southampton (GB); Daniel J. McGinnes, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/844,100

(22) Filed: Sep. 3, 2015

(65) Prior Publication Data

US 2017/0068708 A1    Mar. 9, 2017

(51) Int. Cl.
*G06F 12/0893*    (2016.01)
*G06F 16/2455*    (2019.01)

(52) U.S. Cl.
CPC .... *G06F 12/0893* (2013.01); *G06F 16/24552* (2019.01)

(58) Field of Classification Search
CPC combination set(s) only.
See application file for complete search history.

(56) References Cited

U.S. PATENT DOCUMENTS

| | | | |
|---|---|---|---|
| 6,029,195 A * | 2/2000 | Herz | G06Q 30/02 725/116 |
| 9,258,263 B2 | 2/2016 | Granshaw et al. | |
| 9,736,103 B2 | 8/2017 | Granshaw et al. | |
| 10,218,661 B2 | 2/2019 | Granshaw et al. | |
| 2002/0198858 A1 * | 12/2002 | Stanley | G06F 16/20 706/50 |
| 2006/0069702 A1 * | 3/2006 | Moeller | G06F 9/542 |
| 2007/0005552 A1 | 1/2007 | Klein et al. | |
| 2009/0254601 A1 * | 10/2009 | Moeller | G06F 9/542 709/201 |
| 2010/0306249 A1 * | 12/2010 | Hill | G06F 17/30867 707/769 |
| 2011/0093913 A1 * | 4/2011 | Wohlert | H04L 63/101 726/1 |
| 2011/0154236 A1 | 6/2011 | Stoeck et al. | |
| 2011/0196864 A1 * | 8/2011 | Mason | G06F 3/0416 707/728 |
| 2012/0005210 A1 | 1/2012 | Tavernier et al. | |
| 2012/0133964 A1 * | 5/2012 | Hayakawa | G06F 3/1211 358/1.13 |
| 2013/0282710 A1 * | 10/2013 | Raghavan | G06F 16/838 707/728 |
| 2016/0292194 A1 * | 10/2016 | Farkash | G06F 16/24552 |

OTHER PUBLICATIONS

Anonymous, "Memory Consumption by Registered Object", ip.com, An IP.com Prior Art Database Technical Disclosure, 4 pages. IP.com Electronic Publication: Mar. 16, 2011. IP.com No. 000205147.

* cited by examiner

*Primary Examiner* — Shyue Jiunn Hwa
(74) *Attorney, Agent, or Firm* — Robert J. Shatto

(57) ABSTRACT

Cache memory can be organized to include adapted data objects that reflect queries. A data object can be identified in cache memory. This data object can be identified based on its being referenced by a query, and both the data object and the query can have a number of attributes. The data object can be adapted to create a subset data object that contains only a subset of attributes. This subset of attributes can be those referenced by the query.

20 Claims, 5 Drawing Sheets

Memory Query Tuner 200

Trigger Mechanism 202

Referenced Object Engine 204

Priority Engine 206

Object Subset Factory 208

Object Subset Manager 210

Object Subset Definitions 212

Memory Query Tuner Method 300

FIG. 2

Memory Query Tuner Method (Query Driven) 300B

APPLICATION MEMORY ORGANIZER

BACKGROUND

The present invention relates to database performance and more specifically a database memory organizer. Database can mean any application that uses structured data in a cache.

When maintaining a large data set in memory for the purpose of running queries across the data, a large amount of memory cache may be used. When scaled up to the sizes common for grid or cloud based applications, every piece of data that is not required can have a significant effect on the total amount of data that can be stored in the data set.

SUMMARY

Aspects of the present disclosure may be directed toward a method for organizing cache memory by identifying a data object in cache memory that is referenced by a query. The data object may have a plurality of attributes, and the query may reference one or more attributes. The data object can then be adapted to create a subset data object. This subset data object may contain only the subset of attributes that is referenced by the query.

Aspects of the present disclosure may be directed toward a system for organizing cache memory. The system may have one or more processor circuits that are configured to identify a data object in cache memory that is referenced by a query. The data object may have a plurality of attributes, and the query may reference one or more attributes. The data object can then be adapted to create a subset data object. This subset data object may contain only the subset of attributes that is referenced by the query.

Aspects of the present disclosure may be directed toward a computer program product for organizing cache memory. The computer program product may have a computer readable storage medium with program instructions embodied therewith, and where the computer readable storage medium is not a transitory signal per se. The instructions executable by a computer processing circuit may cause the circuit to perform a method. The method may include identifying a data object in the cache memory that is referenced by a query. The data object may have a plurality of attributes, and the query may reference one or more attributes. The data object can then be adapted to create a subset data object. This subset data object may contain only the subset of attributes that is referenced by the query.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 is a component diagram of a memory query turner, according to embodiments.

Figure 1:
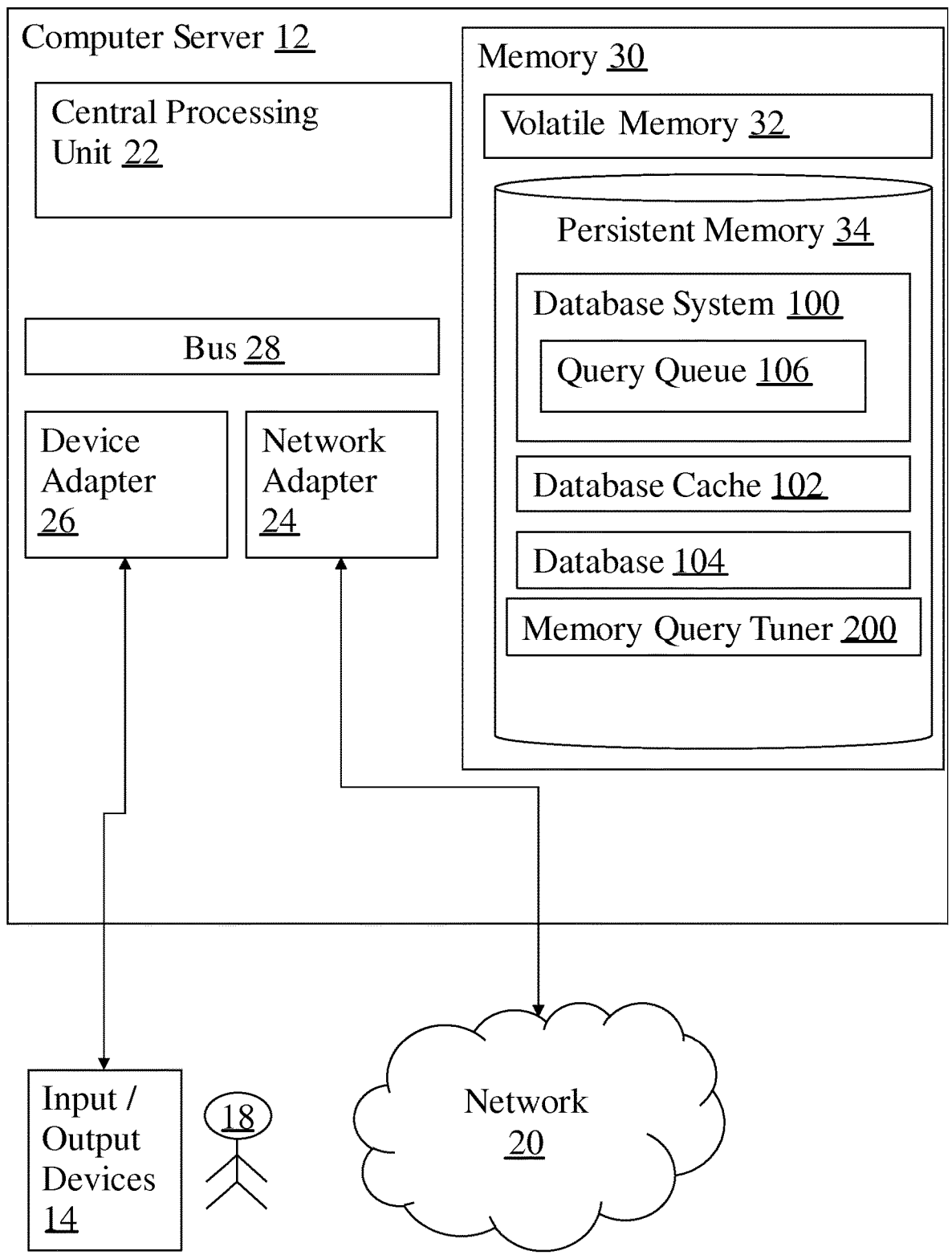
FIG. 1 is a deployment diagram of a computer processing system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Referring to FIG. 1, the deployment of an embodiment in computer processing system 10 is described. The computer processing system shown may be operational with numerous other computing system environments or configurations. Examples of computing processing systems, environments, and configurations that may be suitable for use with the depicted computer processing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment, for example, where a computer processing system is a third party service performed by one or more of a plurality computer processing systems. A distributed computer environment also includes an Internet of things computing environment, for example, where computer processing systems are distributed as a network of objects that can interact with a computing service.

A computer processing system may be described in the general context of computer system-executable instructions, such as program modules, being executed by a computer processor. Program modules may include routines, programs, objects, components, logic, and data structures that perform particular tasks or implement particular abstract data types. The system may be embodied in distributed cloud computing environments where tasks are performed by remote processing devices that are linked through a communications network. In a distributed cloud computing environment, program modules may be located in both local and remote computer system storage media including memory storage devices.

A computer processing system may comprise a computer server 12 and one or more input/output devices 14 in with communication with the computer server 12. The computer server 12 may be connected to a network 20, and it may communicate with a user 18 using input/output devices 14. Input/output devices 14 may include one or more of: a keyboard, a scanner, a mouse, trackball, a display, a printer, or another pointing device or display device. Computer server 12 may communicate with network devices (not shown) over network 20. Network 20 can be a local area network (LAN), a wide area network (WAN), the Internet, or another network. Computer server 12 may comprise a central processing unit (CPU) 22, a network adapter 24, a device adapter 26, a bus 28, and memory 30.

CPU 22 loads machine instructions from memory 30 and performs machine operations in response to the instructions.

Such machine operations include: incrementing or decrementing a value in a register, transferring a value from memory 30 to a register or vice versa, branching to a different location in memory if a condition is true or false (also known as a conditional branch instruction), and adding or subtracting the values in two different registers and loading the result in another register. A CPU may be able to perform many different machine operations. A set of machine instructions may be called a machine code program, the machine instructions are written in a machine code language which is referred to a low level language. A computer program written in a high level language may need to be compiled to a machine code program before it can be run. A machine code program such as a virtual machine or an interpreter may also be able to interpret a high level language in terms of machine operations.

Network adapter 24 may be connected to bus 28 and network 20 for enabling communication between the computer server 12 and network devices. Device adapter 26 is connected to bus 28 and input/output devices 14 for enabling communication between computer server 12 and input/output devices 14.

Bus 28 may couple the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. For example, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 may include computer system readable media in the form of volatile memory 32 and non-volatile or persistent memory 34. Examples of volatile memory 32 are random access memory (RAM) and cache memory. Examples of persistent memory 34 are read only memory (ROM), erasable programmable read only memory (EPROM) and disk drive memory. The system may further include other removable and/or non-removable, volatile and/or non-volatile computer system storage media. By way of example, persistent memory 34 can be provided for reading from and writing to a non-removable, non-volatile magnetic media (not shown and typically a magnetic hard disk or solid-state drive). Although not shown, further storage media may be provided including an external port for removable, non-volatile solid-state memory, and an optical disk drive for reading from or writing to a removable, non-volatile optical disk such as a compact disk (CD), digital video disk (DVD), or Blu-ray. In such instances, each can be connected to bus 28 by one or more data media interfaces. As will be further depicted and described below, memory 30 may include at least one program product having a set of at least one of program modules that are configured to carry out the functions of embodiments of the invention.

According to embodiments, the set of program modules configured to carry out the functions may comprise: database system 100; database cache 102; database 104; and memory query tuner 200. In one embodiment, ROM in the memory 30 stores the modules that may enable the computer server 12 to function as a special purpose computer specific to the modules. Further program modules that support the preferred embodiment but are not shown include firmware, boot strap program, operating system, and support applications. Each of the operating systems, support applications, other program modules, and program data or some combination thereof, may include an implementation of a networking environment.

Computer server 12 communicates with at least one network 20 (such as a local area network (LAN), a general wide area network (WAN), and/or a public network like the Internet) via network adapter 24. Network adapter 24 can communicate with the other components of computer server 12 via bus 28. It should be understood that although not shown, other hardware and/or software components could be used in conjunction with computer server 12. Examples include, but are not limited to, microcode, device drivers, redundant processing units, external disk drive arrays, redundant array of independent disks (RAID), tape drives, and data archival storage systems.

Database system 100 may be a database or application that uses a database or structured data. The embodiments described use data objects having attributes, but other embodiments are envisioned that use other types of data structure. Database system 100 may manage database queries that operate on the database. Such queries typically originate from a user or another system and are stored in a query queue before being processed by the database system 100.

Database cache 102 may be a data structure for storing data objects in volatile memory so that an operational computer processing system can access the data objects quickly. Database cache 102 may be stored in fast volatile memory or inside a processor's cache memory. Database 104 may be a data structure for storing data objects. It may differ from database cache 104 because it may function to store a comprehensive and reliable set of data objects at the expense of speed. Database 104 may remain in persistent memory. Memory query tuner 200 may perform the described embodiments. Other embodiments are envisioned whereby memory query tuner is part of the database system 100 or part of an application that uses structured data and queries on that structure data.

Referring to FIG. 2, memory query tuner 200 may comprise a trigger mechanism 202, a referenced object engine 204, a priority engine 206, an object subset factory 208, an object subset manager 210, an object subset definitions 212, and a memory query tuner method 300.

Trigger mechanism 202 may monitor for events that trigger the memory query tuner 200 to start. In embodiments, such events may include the data cache becoming full or exceeding a threshold capacity.

Referenced object engine 204 may identify an existing object in an overloaded memory cache, and then it may identify a referencing query or queries in the database queue with attributes or characteristics of that existing object. The existing object may be an existing object subset whereby the method of the memory query tuner 200 has been performed on the existing object subset when it was an existing object.

Priority engine 206 may be used to determine object priority and query priority. For instance, an object or object subset that is referenced more times that another object may have a higher priority. A repeating query may have a higher priority than a non-repeating query. Object subset factory 208 may be used for determining a new object subset from attributes in the referencing query or queries. In the preferred embodiment a new object subset may be determined using object subset definitions that allow for a more robust object subset.

Object subset manager 210 may be used for tracking existing objects and object subsets in the data cache and for adapting an existing object to new object subset. The existing object may or may not be an existing object subset. Adaption may occur by physically changing data elements in an existing object or by complete replacement of the object. The object subset manger 210 can also perform removal of unused objects and object subsets in some embodiments. Object subset definitions 212 may store the definitions of object subsets used by the object subset factory 208 for object subset creation.

Figure 3A:
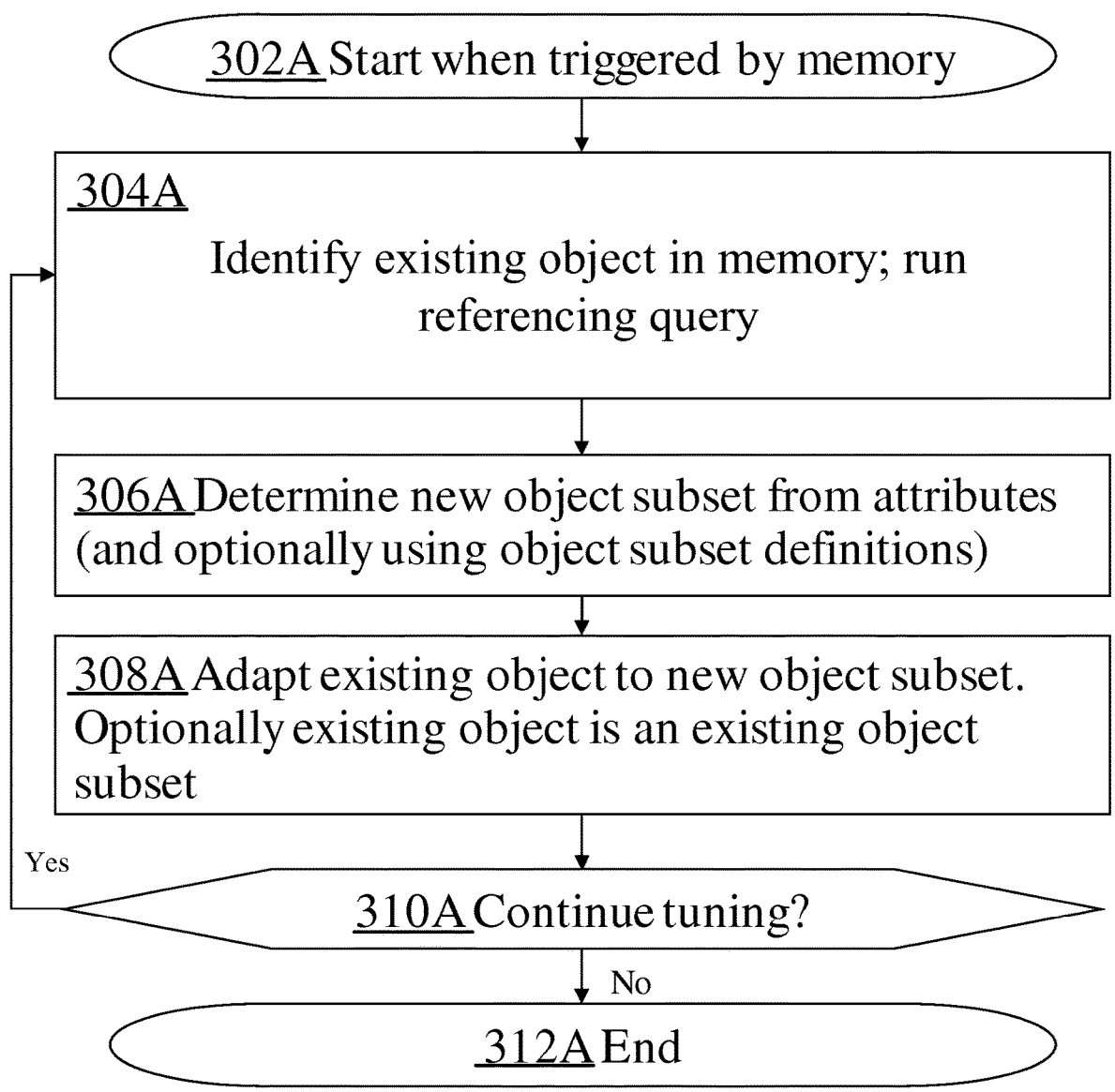
FIG. 3A is a flow diagram of a process for organizing cache memory, according to embodiments.
Figure 3B:
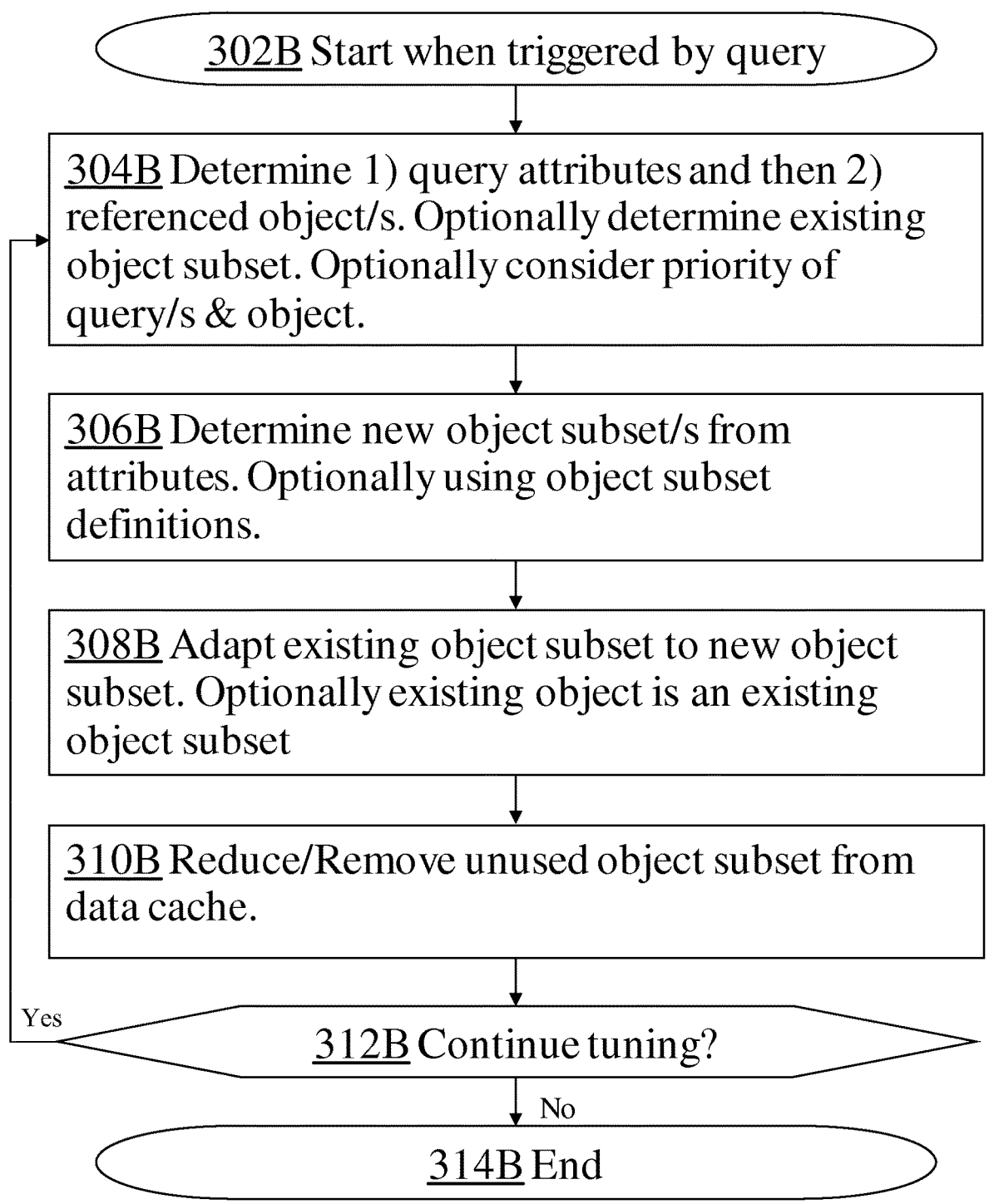
FIG. 3B is a flow diagram of a process organizing cache memory based on a query, according to embodiments.

A memory query tuner method 300 may comprise memory tuner method 300A, as shown in FIG. 3A, according to embodiments. In other embodiments, a memory tuner method may comprise memory tuner method 300B, as shown in FIG. 3B.

Referring to FIG. 3A, memory tuner method 300A may comprise logical process steps 302A to 312A. At step 302A, the method may start when triggered by memory. For example, a detection of one or more cache memory characteristics may trigger the method to start, an example of which may be instance when memory cache is full or nearly full. At step 304A, a system may identify an existing object in the memory cache. The system may then run a referencing query or queries in the database queue along with the attributes in that query. The existing object may be an existing object subset whereby the process memory query tuner method has been performed already on the existing object subset when it was an existing object. The object priority may be considered when determining objects in the data cache whereby such priority is based on the referencing query or queries. For instance, an object or object subset that is referenced more times that another object may have a higher priority. In embodiments, the queries may be held in query queue 106 (of FIG. 1), but in other embodiments there is no queue as such and the queries may then be held in the system.

At step 306A, the system may determine an object subset from attributes in the referencing query or queries. In embodiments, such a new object subset may be determined using object subset definitions that allow for a more robust object subset.

At step 308A, an existing object may be adapted to create a subset data object, where the subset data object containing only a subset of the plurality of attributes. These attributes may correspond to the set of one or more attributes referenced by the query. Initially such adapting may be reducing an existing object to a smaller new object subset having fewer attributes. However, the existing object can be an existing object subset. After an existing object or objects have been reduced to object subsets, they may be adapted back to a whole object. Such adapting can occur by changing the existing object or by removing the existing object and replacing with a new object.

At step 310A, the system may branch back to step 304A if there are more objects to adapt or if there are more memory triggers requesting a response.

If there are no more objects to adapt and no pending memory triggers, at step 312A, the memory query tuner method 300A may end.

FIG. 3B is a flow diagram of a process, memory tuner method 300B, that comprises logical process steps 302B to 314B, according to embodiments.

At step 302B, the method may be triggered by a new query. At step 304B a system may determine query attributes and determine if the query references an existing object in the memory cache with those attributes. In embodiments, the existing object may be an existing object subset whereby the process memory query tuner method has been performed already on the existing object subset when it was an existing object. A priority of the objects may be considered when determining objects in the data cache whereby such priority is determined from the referencing query or queries. For instance, an object or object subset that is referenced more times than another object may have a higher priority.

At step 306B a system may determine a new object subset from attributes in the referencing query or queries. Such a new object subset may be determined using object subset definitions that allow for a more robust object subset. At step 308B an existing object may be adapted to a new object subset. Initially, such adapting may be reducing an existing object to a smaller new object subset with fewer attributes, but the existing object may be an existing object subset. After an existing object or objects have been reduced to object subsets, they may be adapted back to a whole object. Such adapting can occur by changing the existing object or by removing the existing object and replacing with a new object.

At step 310B an unused object or object subsets may be reduced or removed from the data cache. At step 312B, the process may branch back to step 304B if there are more objects to adapt or if there are more queries requesting a response. If no further queries are pending and no additional objects to adapt are in queue, the process may move to end at step 314B.

Figure 4:
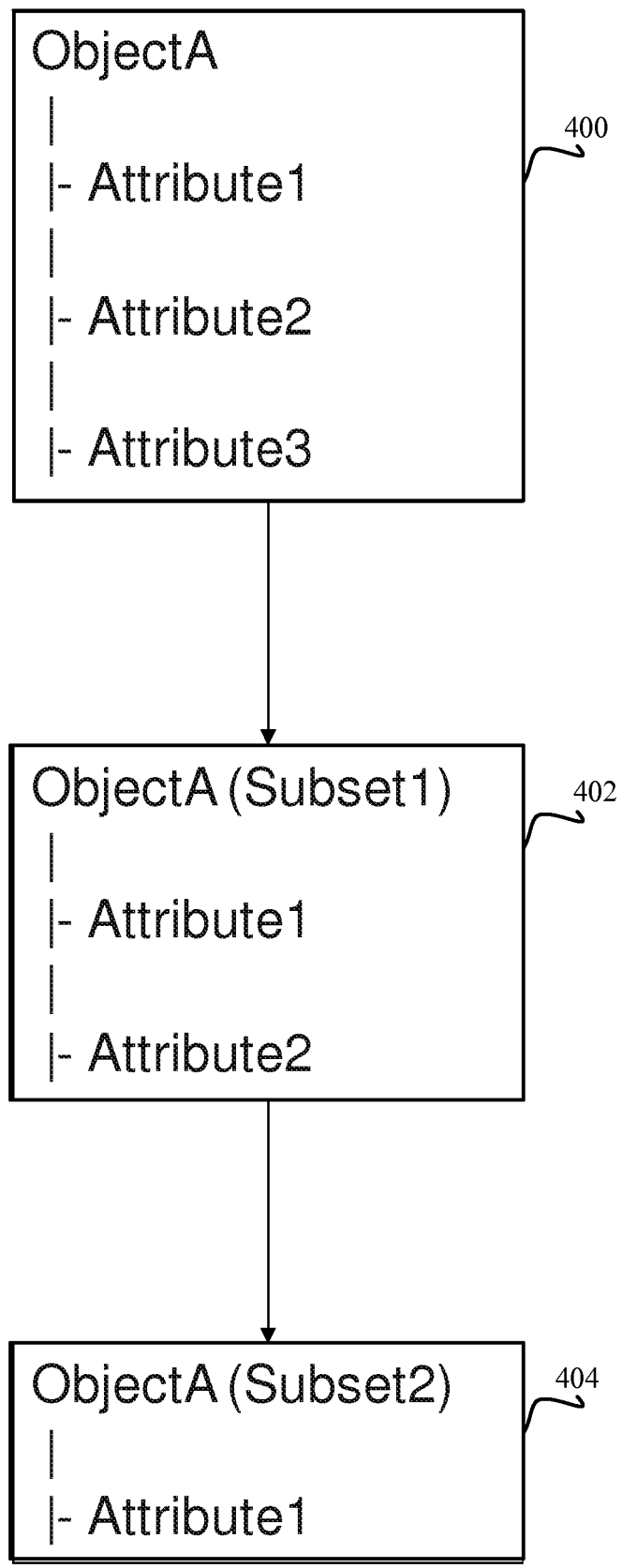
FIG. 4 is a schematic example of a data object being adapted into a first data object subset and a second data object subset, according to embodiments.

FIG. 4 is a schematic example of a data object being adapted into a first data object subset and a second data object subset, according to embodiments. At 400, an example structured and complex data object ObjectA comprises three attribute sets: Attribute1, Attribute2 and Attribute3. Attribute sets may comprise unique sets of attributes in the database. Although the examples are described as a set of attributes, they can also be single attributes.

Consider an example where a query, Query1, is defined to run. Step 304A (from FIG. 3A) may determine that Query1 is defined to run only against only Attribute1 and Attribute2 of ObjectA (not Attribute 3). At 402, a reduced object ObjectA (Subset1) containing only Attribute1 and Attribute2 is determined in step 306A (of FIG. 3A). Step 308A (of FIG. 3A) adapts ObjectA so that it becomes ObjectA (Subset1) comprising: two attribute sets: Attribute1 and Attribute2. Query1 requires ObjectA (Subset1) to calculate the result of the query, and may be invoked frequently (for example many times a day).

Consider a further example for a new query, Query2, that is determined at step 304A (of FIG. 3A) to run only against Attribute1 of Object A (and not Attribute2 and Attribute3). At 404, a reduced object ObjectA (Subset2) containing only Attribute1 may be determined in step 306A (of FIG. 3A). Step 308A (of FIG. 3A) adapts ObjectA (Subset1) so that it becomes ObjectA (Subset2) comprising Attribute1.

If a third example query, Query3, required all the attributes of the object to calculate the result, then ObjectA could be reloaded from disk to calculate the result. In these examples, Query1 and Query2 are deemed more frequently occurring than Query3. This may allow frequent queries like Query1 and Query2 that have smaller memory requirements to benefit from in-memory performance, whereas less frequent queries that require larger data sets could still be fulfilled without drastically impacting the memory requirements of the system. Other permutations of ObjectA are possible.

If a cache memory limit is breached that triggers a reduction of all objects of type ObjectA in memory to ObjectA (Subset1), then only queries dependent upon the values of Attribute1 and Attribute2 can be fulfilled with data in memory. Any queries reliant on the value of Attribute3 will require the data to be read from the database, which may thus degrade performance. In this way it may be possible for the system to be tuned for a balance between memory usage and the number of different queries that can be carried out.

The limits used to trigger the dropping of all data not contained within the current level of subset may vary depending on implementation. For example, a limit may be age based, where once the objects within memory reach a certain age they are reduced to a certain subset of their original size. Another example may be based upon the resource use of the system as a whole. When resource limits are reached, all objects within memory have their storage reduced to the next subset down.

The subsets can be automatically calculated by the system based on the requirements of the queries defined by the user. For example "Average value of Attribute1" may require only Attribute1 and therefore ObjectA (Subset2) whereas "All Objects Where Attribute1>100 & Attribute2=XYZ & Attribute3<20" requires the complete ObjectA.

In an embodiment, the priority of a query could be automatically calculated based on the frequency it is executed. It is also possible that instead of irreversibly dropping the data completely, it could be moved to persistent storage. This would mean that queries could still be satisfied, but with lower performance.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the described embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium or media having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for organizing cache memory, the method comprising:
   identifying, in memory, based on a set of usage data and from a query database, a query with a high priority, wherein the query is used to access a data object, and wherein the priority of the query is calculated using the set of usage data and is based on frequency of execution;
   identifying the data object in the cache memory that is referenced by the query, the data object comprising a plurality of attributes, and the query referencing a set of one or more attributes, wherein the one or more attributes are contained within the plurality of attributes of the data object;
   removing, responsive to a triggering of a limit of the cache memory and based on the identifying a set of data objects in the cache memory, a set of one or more data objects, wherein the set of data objects exclude the identified data object comprising the plurality of attributes, wherein the removing includes moving the set of data objects to persistent storage; and
   adapting the data object to create a subset data object, the subset data object containing only a subset of the plurality of attributes, the subset of the plurality of attributes corresponding to the set of one or more attributes referenced by the query.

2. The method of claim 1, further comprising adapting an existing data object subset to be a new data object subset, the existing data object comprising a second plurality of attributes, the new data object subset containing a subset of the second plurality of attributes, the subset of the second plurality of attributes corresponding to the set of one or more attributes referenced by the query.

3. The method of claim 1, further comprising:
   receiving the query; and
   searching, in response to the receiving, the cache memory to find a set of data objects referenced by the query, the receiving and searching occurring prior to the identifying.

4. The method of claim 1, wherein the subset data object is based on an object subset definition that corresponds to the set of one or more attributes referenced by the query.

5. A computer program product for organizing cache memory, the computer program product comprising a computer readable storage medium having program instructions embodied therewith, wherein the computer readable storage medium is not a transitory signal per se, the program instructions executable by a computer processing circuit to cause the circuit to perform a method comprising:
   identifying a query to access a data object, the query referencing one or more attributes;
   determining that the data object is stored in a cache memory, wherein the data object includes the one or more attributes referenced by the query and one or more additional attributes; and
   modifying the data object to generate a subset data object, the subset data object containing only the one or more attributes referenced by the query.

6. The computer program product of claim 5, wherein modifying the data object comprises:

removing the data object from the cache memory; and
storing the subset data object in place of the removed data object in the cache memory.

7. The computer program product of claim 6, wherein the removing the data object from the cache memory is performed in response to a triggering of a limit of the cache memory.

8. The computer program product of claim 6, wherein the method performed by the circuit further comprises:
moving the data object to persistent storage prior to removing the data object from the cache memory.

9. The computer program product of claim 6, wherein identifying the query comprises:
receiving the query; and
searching, in response to the receiving, the cache memory to find a set of data objects referenced by the query, wherein the set of data objects includes the data object.

10. The computer program product of claim 9, wherein the set of data objects referenced by the query includes a plurality of data objects stored in the cache memory, and wherein determining, modifying, removing, and storing operations are performed for each of the plurality of data objects in response to a cache memory trigger.

11. The computer program product of claim 5, wherein the method performed by the circuit further comprises detecting, prior to the identifying the data object, an indication that an available capacity of the cache memory is below a threshold, and wherein the identifying the data object is performed in response to a determination that the available capacity is below the threshold.

12. The computer program product of claim 5, wherein the subset data object is based on an object subset definition that corresponds to the one or more attributes referenced by the query.

13. The computer program product of claim 5, wherein the method performed by the circuit further comprises determining that the query has a high priority, wherein the priority of the query is calculated using a set of usage data and is based on a frequency of execution of the query.

14. The computer program product of claim 5, wherein modifying the data object to generate the subset data object comprises removing the one or more additional attributes from the data object.

15. The computer program product of claim 5, wherein one or more queries are stored in a query queue, and wherein the method performed by the circuit further comprises:
identifying a plurality of data objects stored in the cache memory;
determining a priority of each data object of the plurality of data objects based on a number of queries that reference each data object; and
removing one or more data objects of the plurality of data objects from the cache memory, the one or more removed data objects being data objects of the plurality of data objects that have a low priority.

16. The computer program product of claim 5, wherein the method performed by the circuit further comprises:
receiving a second query, the second query referencing the one or more attributes and the one or more additional attributes, wherein the second query is received after the data object is removed from the cache memory;
determining that the data object is stored in persistent storage; and
executing the second query against the persistent storage.

17. The computer program product of claim 5, wherein the method performed by the circuit further comprises executing the query against the subset data object.

18. A system for organizing cache memory, the system comprising:
at least one processor circuit configured to perform a method comprising:
identifying a query to access a data object, the query referencing one or more attributes;
determining that the data object is stored in a cache memory, wherein the data object includes the one or more attributes referenced by the query and one or more additional attributes; and
modifying the data object to generate a subset data object, the subset data object containing only the one or more attributes referenced by the query, wherein the data object is modified while still in the cache memory.

19. The system of claim 18, wherein the method further comprises:
removing the data object from the cache memory after the subset data object is generated; and
storing the subset data object in place of the removed data object in the cache memory.

20. The system of claim 18, wherein modifying the data object comprises removing the one or more additional attributes from the data object, and wherein the method further comprises:
determining that the query has a high priority, wherein the priority of the query is calculated using a set of usage data and is based on a frequency of execution of the query,
wherein the modifying the data object is performed in response to determining that the query has a high priority.

* * * * *